United States Patent [19]

Choi

[11] Patent Number: 5,454,083
[45] Date of Patent: Sep. 26, 1995

[54] TARGET SELECTION RESPONSE CIRCUIT FOR A SMALL COMPUTER SYSTEM INTERFACE

[75] Inventor: Seung J. Choi, Seoul, Rep. of Korea

[73] Assignee: Goldstar Co., Ltd., Seoul, Rep. of Korea

[21] Appl. No.: 997,837

[22] Filed: Dec. 29, 1992

[30] Foreign Application Priority Data

Dec. 31, 1991 [KR] Rep. of Korea .................. 91-25782

[51] Int. Cl.$^6$ ............................................ G06F 13/36
[52] U.S. Cl. .................................. 395/285; 395/280
[58] Field of Search ................... 395/325, 775, 395/800, 275, 425

[56] References Cited

U.S. PATENT DOCUMENTS

| | | | |
|---|---|---|---|
| 4,864,291 | 9/1989 | Korpi | 340/825.5 |
| 4,965,801 | 10/1990 | DuLac | 371/40.1 |
| 5,283,872 | 2/1994 | Ohnishi | 395/325 |
| 5,343,426 | 8/1994 | Cassidy et al. | 365/189.02 |
| 5,367,647 | 11/1994 | Coulson et al. | 395/325 |

OTHER PUBLICATIONS

*Patent Abstracts of Japan;* vol. 14, No. 508, p. 1128 (Nov. 7, 1990).

BYTE, "Ciarcia's Adding SCSI to the SB180 Computer, II. Bus Phases," vol. 11, No. 6, pp. 107–114 (Jun. 1986).

*Primary Examiner*—Jack B. Harvey
*Assistant Examiner*—Glenn A. Auve
*Attorney, Agent, or Firm*—Pennie & Edmonds

[57] ABSTRACT

A selection response circuit according to SCSI (small computer system interface), where a selection response device is designed with a digital logic having a simple structure. The present circuit comprises a bus checking unit for checking the status of an SCSI bus, an ID bit checking units for checking whether a bit corresponding to the ID of itself is active on the bus, and a bus free checking unit for checking the status of a BSY signal and an SEL signal on the SCSI bus to determine whether all SCSI units are using the bus.

6 Claims, 9 Drawing Sheets

FIG. 6

| Signal | | | | | | | | | | ‖ | | |
|---|---|---|---|---|---|---|---|---|---|---|---|---|
| OUT0 | 0 | 1 | 1 | 0 | 1 | 0 | 0 | 1 | 1 | ‖ | 1 | 0 |
| OUT1 | 0 | 0 | 0 | 1 | 0 | 1 | 1 | 1 | 0 | ‖ | 1 | 0 |
| OUT2 | 0 | 0 | 0 | 0 | 0 | 0 | 0 | 0 | 0 | ‖ | 1 | 0 |
| OUT3 | 0 | 0 | 0 | 0 | 0 | 0 | 0 | 0 | 0 | ‖ | 0 | 1 |
| AB0  | 0 | 1 | 0 | 1 | 0 | 1 | 0 | 1 | 0 | ‖ | 0 | 1 |
| AB1  | 0 | 0 | 1 | 1 | 0 | 0 | 1 | 1 | 0 | ‖ | 1 | 1 |
| AB2  | 0 | 0 | 0 | 0 | 1 | 1 | 1 | 1 | 0 | ‖ | 1 | 1 |
| AB3  | 0 | 0 | 0 | 0 | 0 | 0 | 0 | 1 | 1 | ‖ | 1 | 1 |
| AB4  | 0 | 0 | 0 | 0 | 0 | 0 | 0 | 0 | 0 | ‖ | 1 | 1 |
| AB5  | 0 | 0 | 0 | 0 | 0 | 0 | 0 | 0 | 0 | ‖ | 1 | 1 |
| AB6  | 0 | 0 | 0 | 0 | 0 | 0 | 0 | 0 | 0 | ‖ | 1 | 1 |
| AB7  | 0 | 0 | 0 | 0 | 0 | 0 | 0 | 0 | 0 | ‖ | 1 | 1 |

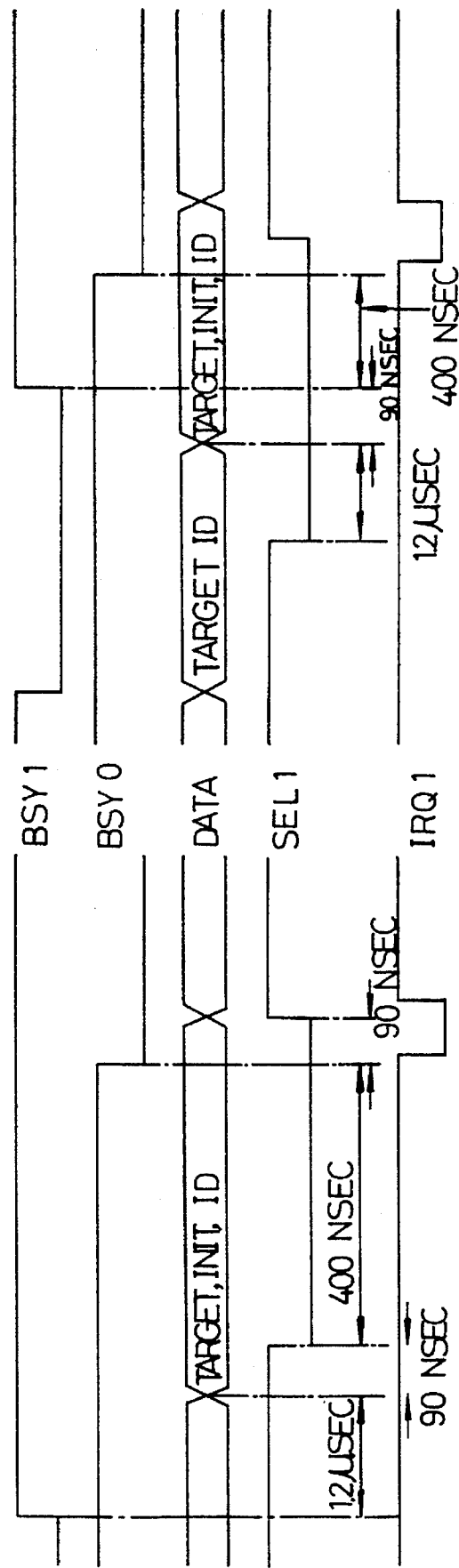

5,454,083

TARGET SELECTION RESPONSE CIRCUIT FOR A SMALL COMPUTER SYSTEM INTERFACE

BACKGROUND OF THE INVENTION

The present invention relates to a small computer system interface (hereinafter referred to as SCSI), and more particularly to a selection response circuit according to SCSI which realizes a selection response function by a digital hardware.

Generally, SCSI is the regulations affecting the interface for connecting a small computer, i.e., a personal computer, and external peripheral units. Currently, the regulations are standardized with respect to a magnetic disc unit such as a floppy disc driver and a hard disc driver, and an optical disc unit such as a compact disc ROM, and a printer.

FIGS. 1A to 1C show systems connected according to SCSI, where one computer 1A can be coupled to one controller 2A by a mutual SCSI bus (as shown in FIG. 1A), or one computer 1B can be coupled to two controllers 2B and 2C by an SCSI bus (as shown in FIG. 1B). Also, two or more computers 1C to 1E can be coupled to a plurality of controllers 2D to 2H by an SCSI bus. That is, one or a plurality of computers 1A to 1E control one or a plurality of controllers 2A to 2H as a target.

FIG. 2 is a functional diagram with respect to phase conversion in SCSI. A bus free phase P1 used in FIG. 2 is the phase in which all SCSI units do not use a bus. An arbitration phase P2 is for an SCSI unit to obtain the use of a bus, and a selection phase P3 or a reselection phase P4 is for an initiator (computer) to select an SCSI unit operated as a target and winning in arbitration. An information transmission phase P5 (message out, comment, data in, data out, status, message in) is to transmit/receive actually needed information between an initiator and a target.

Meanwhile, FIG. 3 shows an SCSI bus intermediating data transmission between a computer 1F and a controller 2I, in which the SCSI bus has data bits, a parity bit, and control signal bits.

The selection phase among the respective bus phases is for an initiator (computer) to select an SCSI unit operated as a target, and winning in arbitration. The response sequence in the selection phase of SCSI is as follows.

That is, when a bus is not used by all SCSI units and data on the bus is equal to identification (hereinafter referred to as ID) of the SCSI unit itself, and IDs of three or more SCSI units are not active over a predetermined time, it is automatically indicated that the target is selected with respect to the initiator.

Conventionally, such a selection response function of SCSI units is performed using the software of a computer. That is, after it is identified that there is a selection phase, it is identified that the ID of the SCSI unit itself is active by reading data on a data bus and the active bit is one bit (i.e., ID of the itself) or 2 bits (i.e., IDs of SCSI unit itself and its host computer), using a switch or a switching device, and then the response with respect to this is performed.

Also, there is a system using an SCSI controller IC to obtain a selection response, but the internal constitution of such an SCSI controller IC and the selection response type have not been known.

SUMMARY OF THE INVENTION

It is an object of the present invention to provide a selection response circuit according to SCSI where a selection response function according to SCSI is performed by a digital logic circuit having a simplified construction.

To achieve the object, a selection response circuit of the present invention comprises:

bus checking means for checking status of an SCSI bus;

ID bit checking means for checking whether a bit corresponding to ID of itself is active on the bus; and bus free checking means for checking the status of a busy(BSY) signal and a selection(SEL) signal on the SCSI bus to determine whether all of SCSI units are using the bus.

BRIEF DESCRIPTION OF THE DRAWINGS

The above object and other advantages of the present invention will become more apparent by describing the preferred embodiment of the present invention with reference to the attached drawings, in which:

FIG. 6 is a truth table explaining the operational state of the slice adder within FIG. 4;

FIGS. 10A and 10B are timing diagrams of selection signals according to the used state of arbitration.

DETAILED DESCRIPTION OF THE INVENTION

Figure 1A:
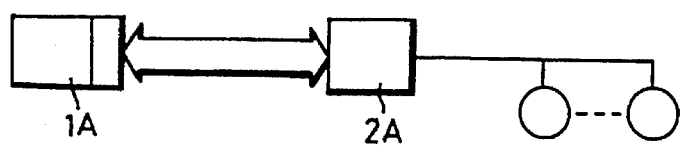
FIGS. 1A to 1C show connection states of systems coupled according to SCSI.
Figure 1B:
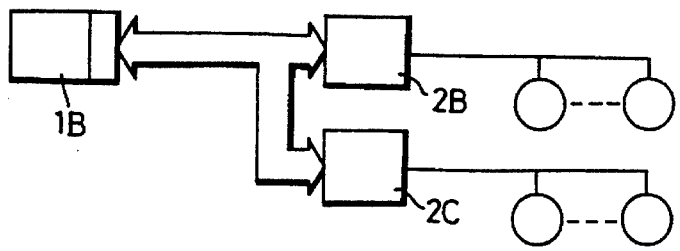
Figure 1C:
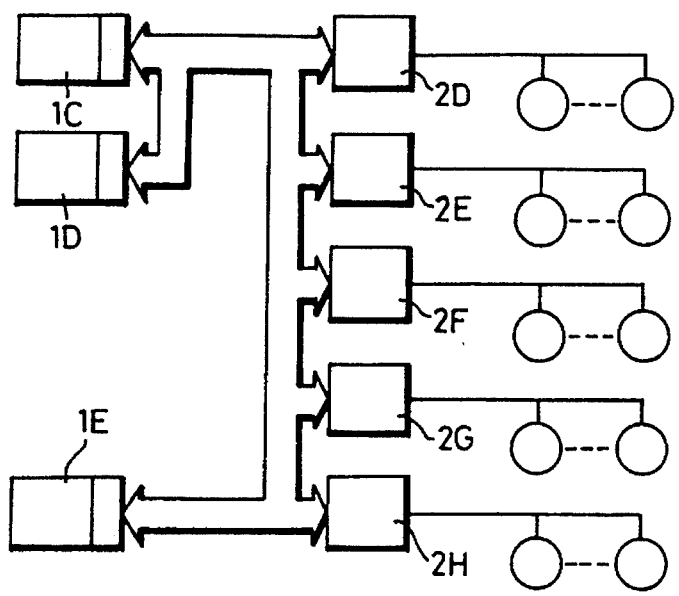
Figure 2:
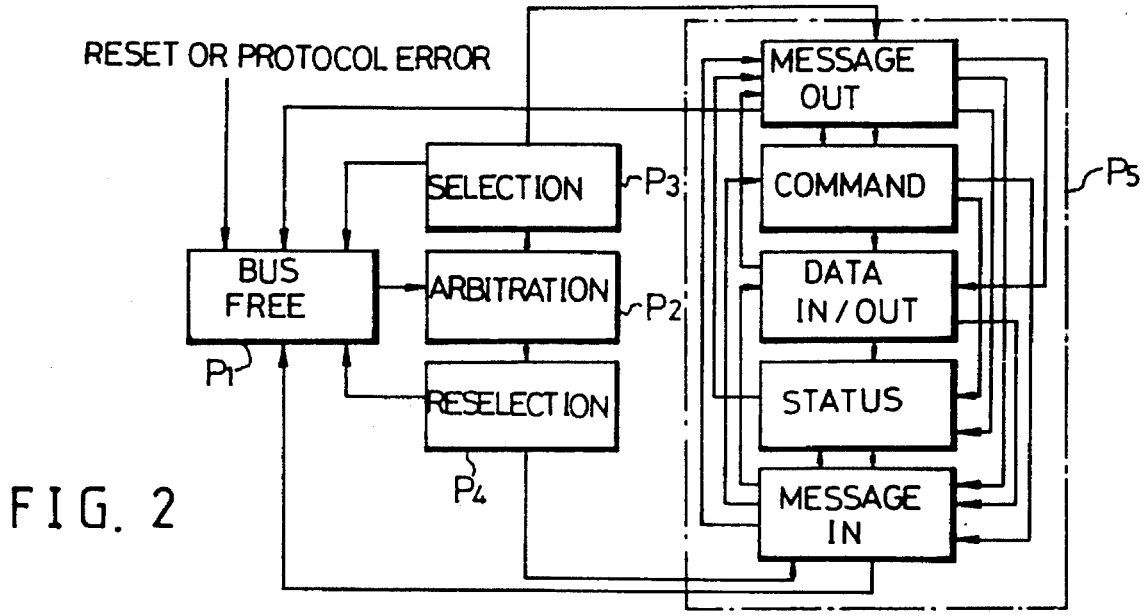
FIG. 2 is a block diagram explaining the phase conversion function in SCSI.
Figure 3:
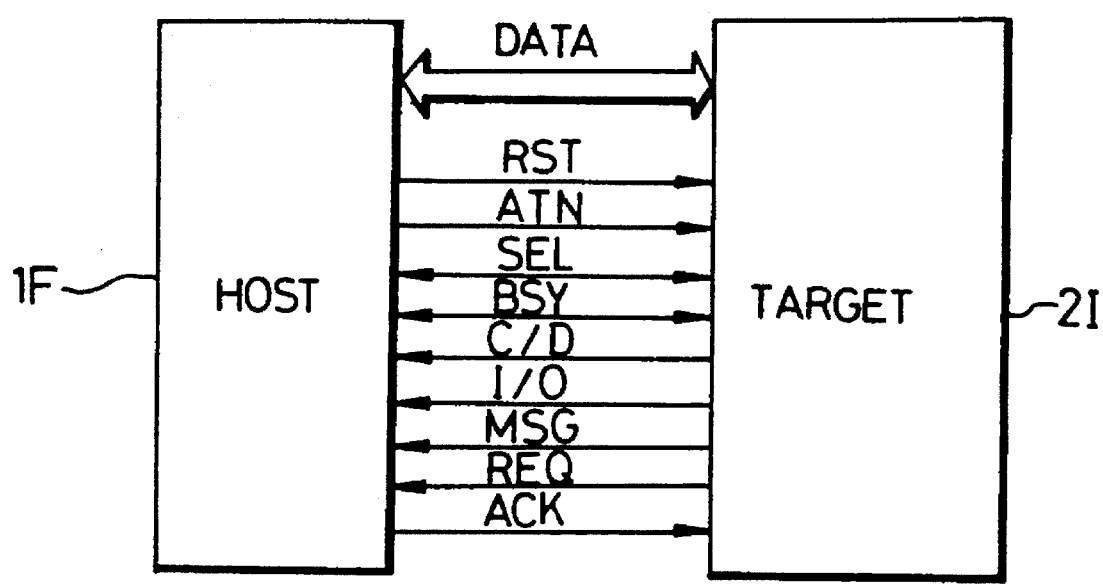
FIG. 3 is a connection state diagram of a SCSI bus.
Figure 4:
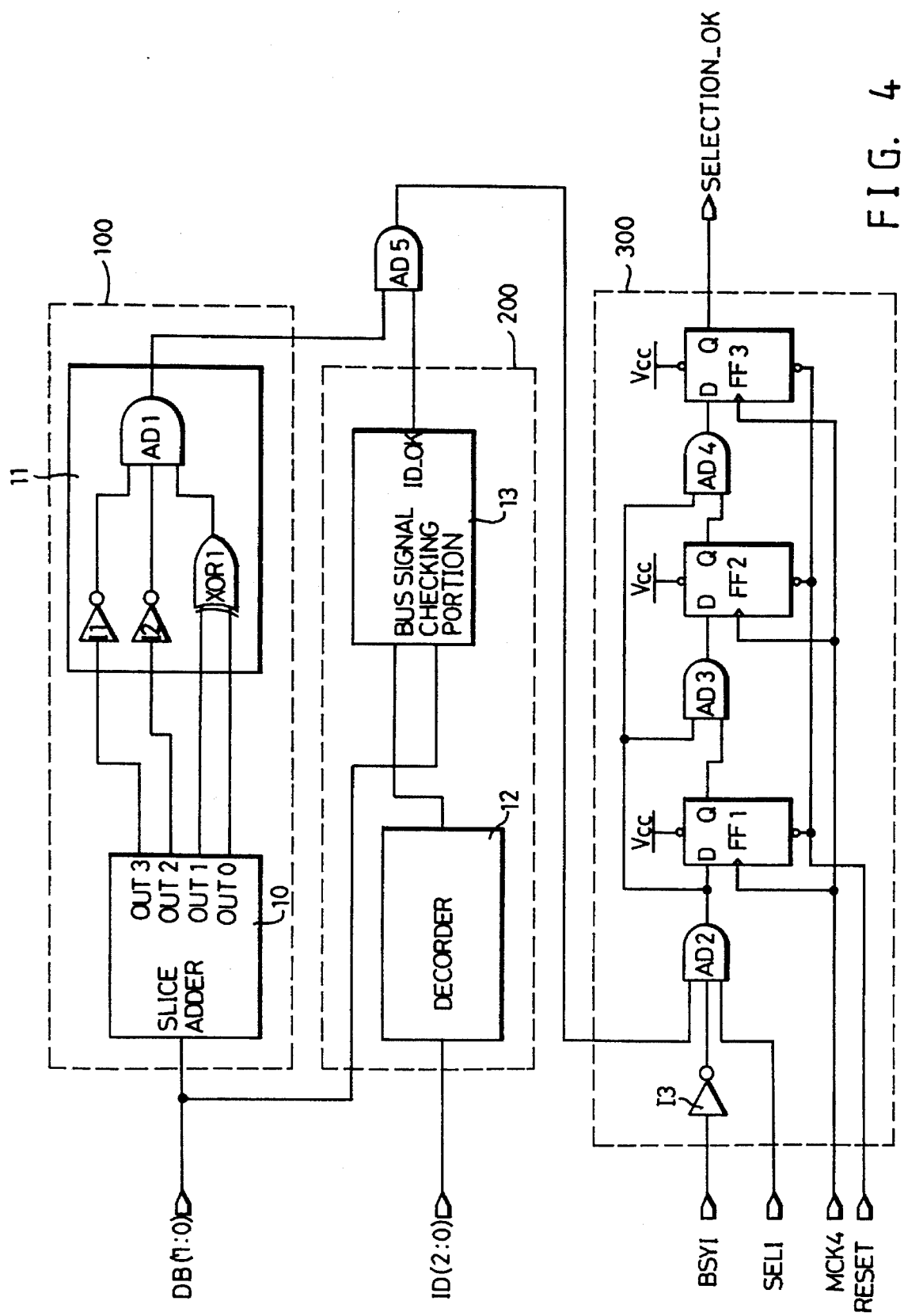
FIG. 4 is an embodiment of a present selection response circuit according to SCSI.

FIG. 4 shows an embodiment of a selection response circuit according to the present invention. A bus check portion 100 comprises a slice adder 10 for checking whether bits below three (two bits or one bit) are active on an SCSI bus, and a signal output check portion 11 for checking whether an output of the slice adder 10 is 1 or 2. An ID bit check portion 200 comprises a decoder 12 for decoding ID bit of the SCSI unit itself to check whether a bit corresponding to the ID the of SCSI unit itself is active on the SCSI bus, and a bus signal check portion 13 for checking whether a decoded output from the decoder is equal to a signal on the SCSI bus. Meanwhile, the selection response circuit of the present invention comprises a bus free check portion 300 which checks whether BSY and SEL signals on SCSI bus are at "high", thereby determining whether all of the SCSI units are using the bus.

Figure 5:
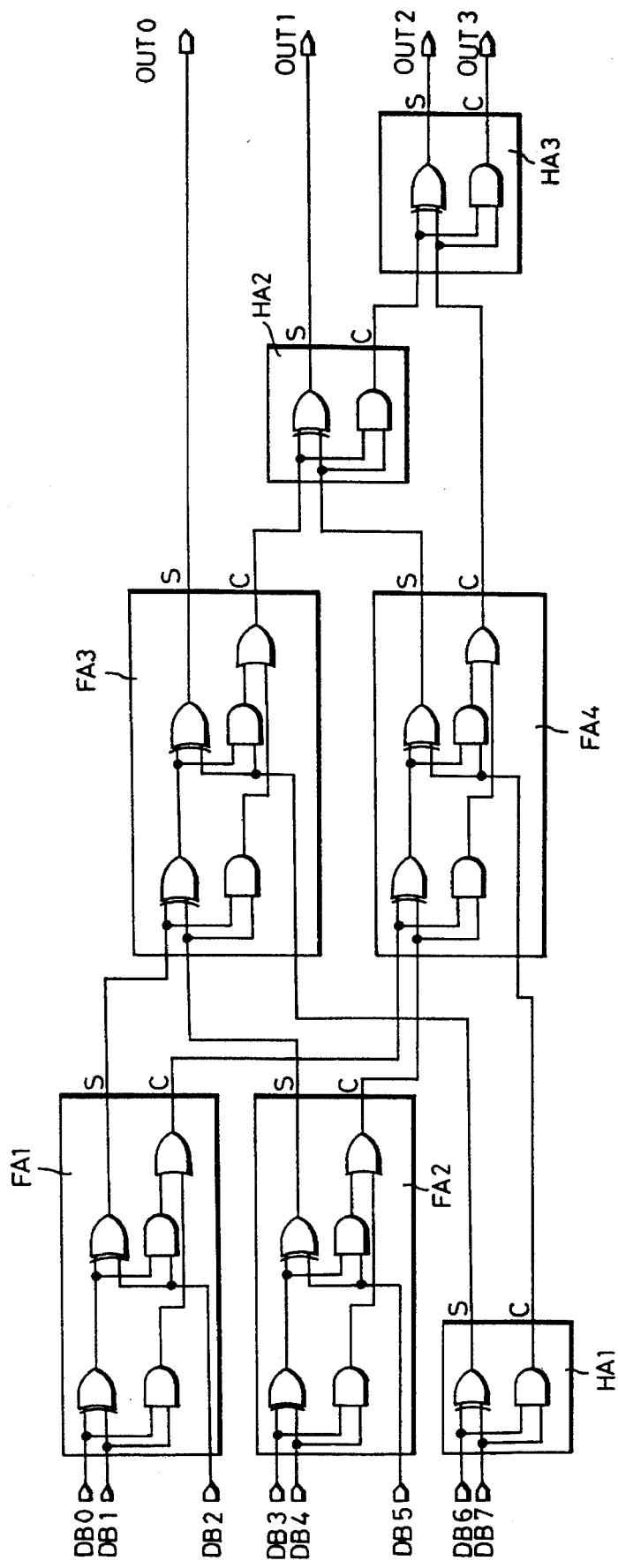
FIG. 5 is a circuit diagram of a preferred embodiment of a slice adder within FIG. 4.

First of all, the slice adder 10 functions to check whether bits below three among the data bus eight bits, i.e., one bit or two bits, are As shown in FIG. 5, this is achieved by by coupling full-adders FA1 to FA4 and half-adders HA1 to HA3.

That is, lower six bits of eight-bit data are inputted to the full-adders FA1 and FA2, respectively, and upper two bits are inputted to the half-adder HA1. Sum outputs S and carry outputs C of the respective adders FA1, FA2 and HA1 are inputted to the full-adders FA3 and FA4, respectively. A first output OUT0 is drawn out from the sum output terminal S of the full-adder FA3 and the carry output C of the full-adder FA3 and the sum output S of the full-adder FA4 are inputted to the half-adder HA2. A second output OUT1 is drawn out from one output of the half-adder HA2. Also, the other output of the half-adder HA2 is inputted to the half-adder HA3 to be summed with the carry output C of the full-adder FA4, and a sum output S and a carry output C of the half-adder HA3 are drawn out as outputs OUT2 and OUT3. Such operation of a slice adder 10 shows the characteristics of the truth table shown in FIG. 6, and accordingly, when only one or two bits are activated, is outputted.

Figure 7:
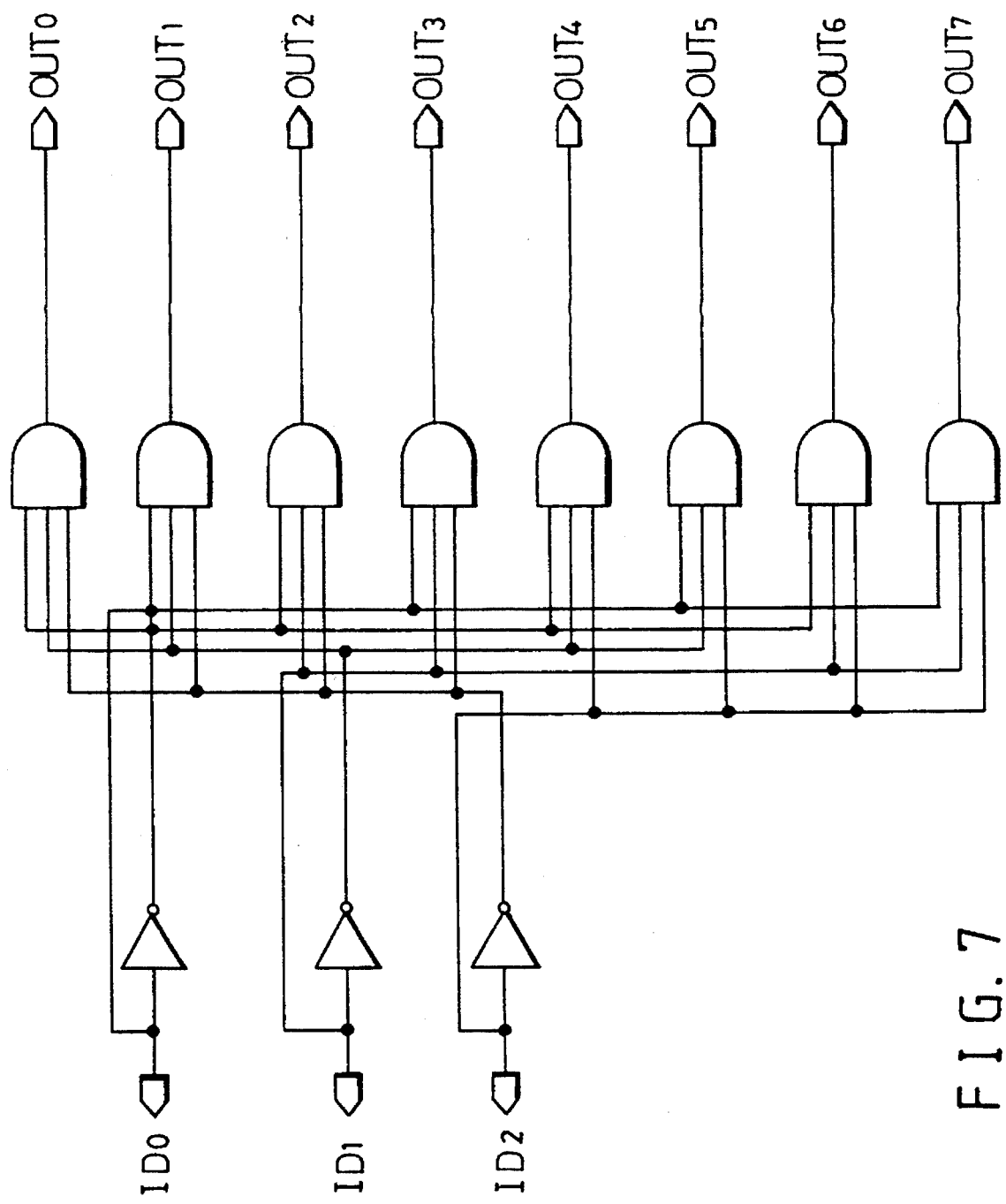
FIG. 7 is a circuit diagram of a preferred embodiment of a decoder within FIG. 4.

Meanwhile, FIG. 7 is a circuit diagram of a decoder 12 for decoding an ID bit of the SCSI unit itself to check whether the bit corresponding to the ID of the SCSI unit itself on the SCSI bus is activated in FIG. 4, where a 3*8 decoder is used.

The decoder 12 performs the basic operation of a general decoder where bits corresponding to previous values of input signals ID0 to ID3 are activated to be 1 and the other remaining bits are activated to be zero level.

Figure 8:
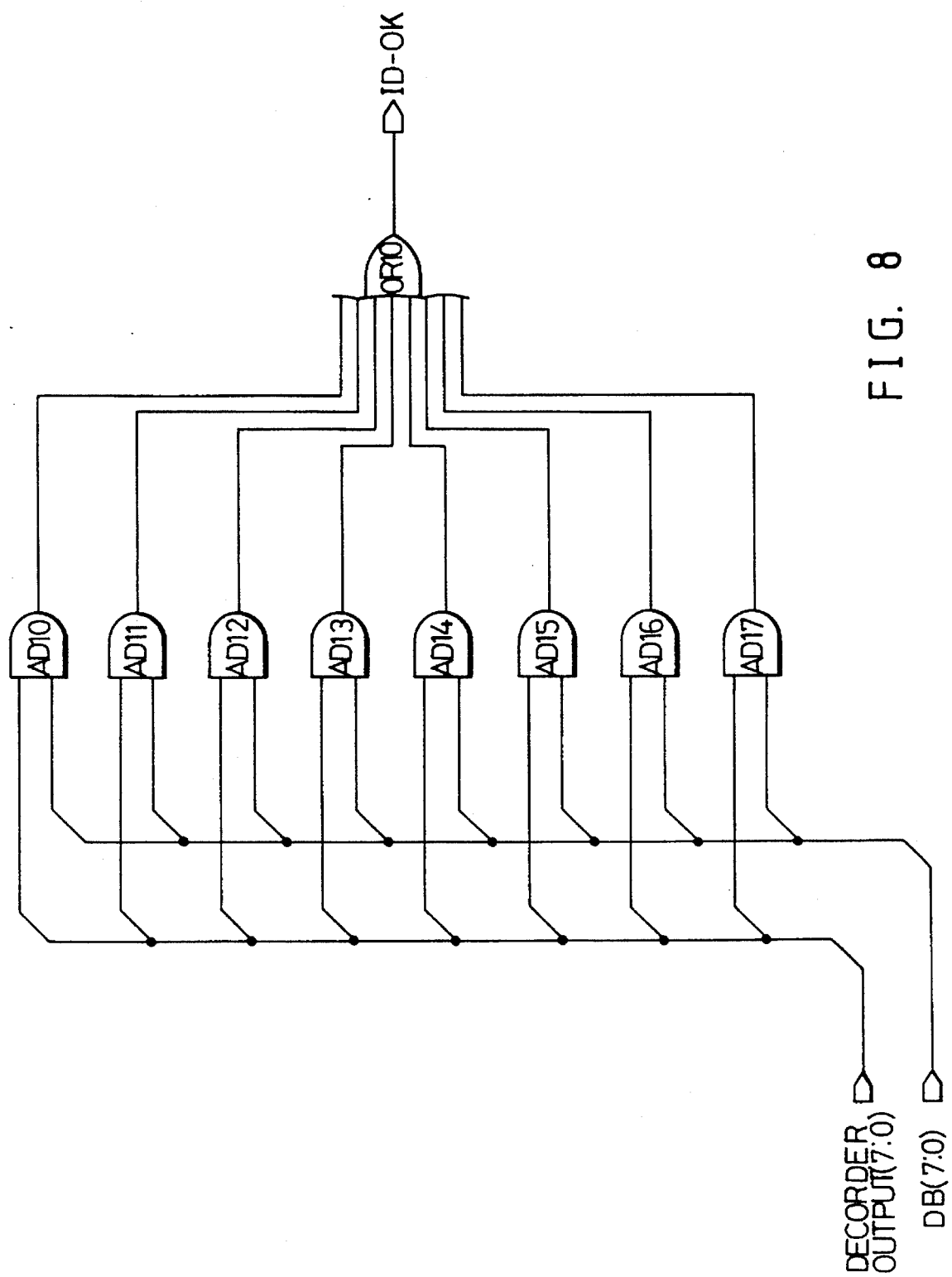
FIG. 8 is a circuit diagram of a preferred embodiment of a bus signal check portion within FIG. 4.

FIG. 8 shows an embodiment of a bus signal check portion 13 for checking whether an output decoded from the decoder 12 is the same as the signal on the SCSI bus. Outputs of the decoder 12 and the corresponding bits of compared data are inputted to the respective AND gates AD10 to AD17, whose outputs are OR-gated by an OR gate OR10, so that even if one specific output bit of decoder 12 is equal to a corresponding bit of compared data, its output becomes 'high' to be outputted as a selection identification signal.

Figure 9:
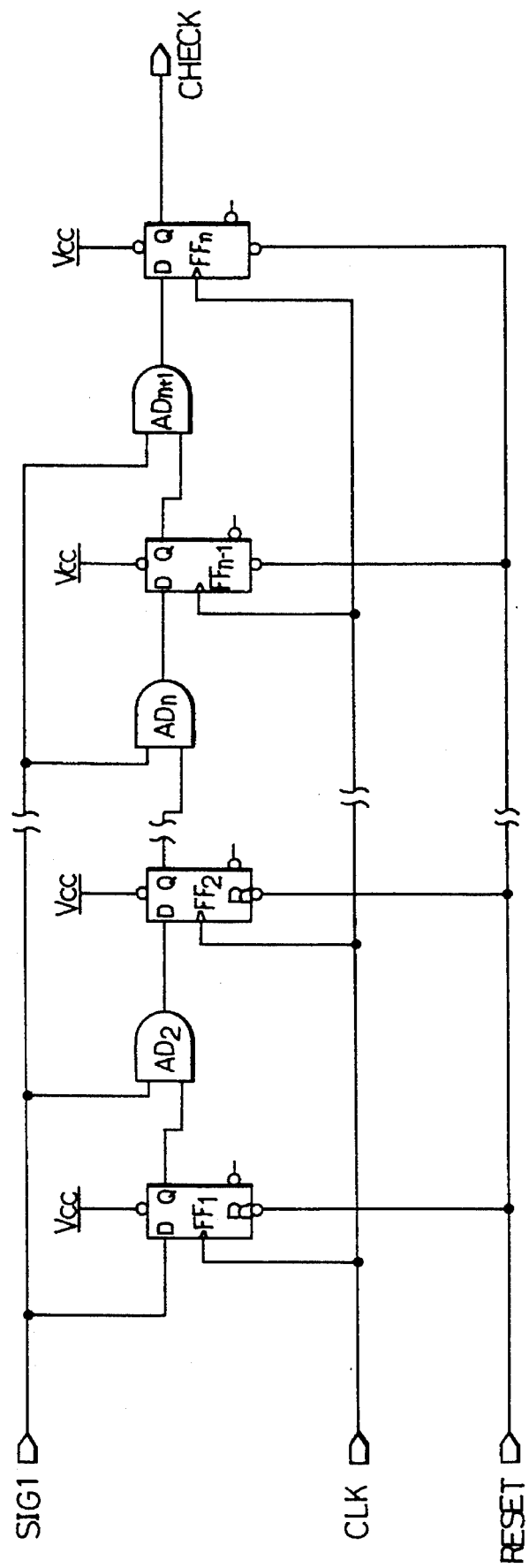
FIG. 9 is a circuit diagram of a preferred embodiment of a bus free check portion within FIG. 9.

Meanwhile, FIG. 9 shows another embodiment of a bus free check portion 300 for checking how many periods the same value is maintained with respect to successive clocks of a specific signal (here, Sig 1). In the embodiment of the FIG. 4, the durability of input signal Sig 1 is checked for three periods of clock signal CLX using three flip-flops FF1 to FF3. However, if the state of the input signal Sig 1 is checked with respect to a period longer than the above period, a plurality of flip-flops FF1 to FFn and AND gates AD2 to ADn+1 are used by being successively coupled in parallel in the same structure.

Accordingly, if an input signal Sig 1 is 'high', in the next clock CLX, a 'high' level signal is transferred to the next flip-flop. But, if an input signal Sig 1 becomes 'low', the outputs of AND gates AD2 to ADn+1 become directly 'low', so that in the next clock CLX, all outputs of the flip-flops FF1 to FFn become 'low'.

Accordingly, if it is checked when the flop-flop FFn of final stage becomes 'high' and the number of flip-flops coupled in parallel is known, it can be obtained how long the input signal maintains a constant value.

Meanwhile, the operation of generating a selection signal by the selection response device of FIG. 4 is as follows.

The selection process for selecting an SCSI device operated as a target by an initiator is different in an arbitration-used system and an arbitration unused system.

First of all, as shown in the timing diagram of FIG. 10A, in a system which does not use arbitration, the initiator detects a bus free status, waits for 800 nsec, activates ID bits of target and initiator itself, waits for 90 nsec, and then activates an SEL signal.

However, in a system using arbitration, an initiator activates a selection SEL signal in an arbitration phase, and activates ID bits of target and initiator, itself on the data bus after a time longer than about 1.2 μsec, i.e., after the sum of bus clear delay and bus stability delay time, elapses. Then, after a time over 90 nsec elapses, a BSY signal is inactivated, the initiator again waits for over 90 nsec, and then waits a response from the target.

Meanwhile, in a response sequence with respect to the selection, the SCSI unit (target) detects that SEL signal and data bus bits corresponding to the ID of the SCSI unit itself are activated and the BSY signal and input/output (I/O) signal are deactivated for about 400 nsec, i.e., an interval longer than bus settling delay, thereby recognizing that it itself is selected in selection phase.

The target should respond with respect to the initiator by activating a BSY signal within about 400 nsec from its selection detecting time, i.e., within a selection failure time. At this time, the selected target checks every bit on the data bus to identify the SCSI ID of the initiator. When three SCSI IDs or more are detected on the data bus, the target does not respond to the selection phase.

And, after the initiator detects a response of BSY signal from the target, it deactivates the SEL signal after 90 nsec elapses, thereby ending the selection phase.

As described above, according to the present invention, the selection response device between a computer and peripheral units, according to the international standard interface, i.e., SCSI, has the advantages of being designed with digital logic of a simple structure, and being included in the conventional SCSI protocol IC.

What is claimed is:

1. A target selection response circuit for a small computer system interface (SCSI) comprising:

bus checking means for checking a status of a SCSI bus, said bus checking means comprising a slice adder for checking active bits among data bits received through said SCSI bus and providing an output signal in response thereto; and a signal output checking means for determining whether only a target or both the target and a host computer are in an active state in response to said output signal of said slice adder;

identification bit checking means for checking whether a bit corresponding to an identification of the target is active on said SCSI bus in order for the target to use said SCSI bus; and bus free checking means for checking whether said SCSI bus is in a bus free state by checking a status of a busy signal and a selection signal on said SCSI bus.

2. A target selection response circuit according to claim A, wherein said slice adder comprises:

first and second full-adders for receiving bits 0 to 5 of input data and outputting sum outputs and carry outputs;

a first half-adder for receiving bits 6 and 7 of said input data and outputting a sum output and a carry output;

third and fourth full-adders for summing said sum outputs and carry outputs of said first and second full-adders and said first half-adder, a first output being obtained from a sum terminal of said third adder;

a second half-adder for summing a carry output of said third full-adder and a sum output of said fourth full-adder, a second output being obtained from a sum output terminal of said second half-adder; and a third half-adder for adding a carry output of said second half-adder and a carry output of said fourth full-adder, third and fourth outputs being obtained from said third half-adder.

3. A target selection response circuit according to claim 1, wherein said signal output checking means comprises:

first and second inverters for inverting two different output signals of said slice adder;

an exclusive-OR gate for exclusive-OR gating two different output signals from outputs of said slice adder; and an AND gate for AND-gating outputs of said first and second inverters and said exclusive-OR gate.

4. A target selection response circuit according to claim 1, wherein said target identification bit checking means comprises:

a decoder for decoding a target identification bit in order to check whether said target identification bit is active on said SCSI bus; and bus signal checking means for checking whether an output signal of said decoder identifies a corresponding bit signal active on said SCSI bus.

5. A target selection response circuit according to claim 4, wherein said decoder is a 3×8 decoder.

6. A target selection response circuit according to claim 4, wherein said bus signal checking means comprises:

eight AND gates for AND-gating output signals of said decoder and corresponding data bits on said SCSI bus; and an OR gate for OR-gating output signals of said AND gates.

* * * * *